US011026119B2

United States Patent
Kloiber et al.

(10) Patent No.: US 11,026,119 B2
(45) Date of Patent: Jun. 1, 2021

(54) RADIO COMMUNICATION SYSTEM FOR AN INDUSTRIAL AUTOMATION SYSTEM AND METHOD FOR OPERATING THE RADIO COMMUNICATION SYSTEM

(71) Applicant: SIEMENS AKTIENGESELLSCHAFT, Munich (DE)

(72) Inventors: Bernhard Kloiber, Feldkirchen-Westerham (DE); Andreas Kornbichler, Dietramszell (DE); Siegfried Richter, Lauf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/964,235

(22) PCT Filed: Dec. 17, 2018

(86) PCT No.: PCT/EP2018/085251
§ 371 (c)(1),
(2) Date: Jul. 23, 2020

(87) PCT Pub. No.: WO2019/145094
PCT Pub. Date: Aug. 1, 2019

(65) Prior Publication Data
US 2021/0045010 A1  Feb. 11, 2021

(30) Foreign Application Priority Data
Jan. 24, 2018 (EP) .................................... 18153191

(51) Int. Cl.
*H04W 28/06* (2009.01)
*H04W 84/12* (2009.01)
(Continued)

(52) U.S. Cl.
CPC ............. *H04W 28/06* (2013.01); *H04W 4/06* (2013.01); *H04W 4/70* (2018.02); *H04W 72/0453* (2013.01); *H04W 84/12* (2013.01)

(58) Field of Classification Search
CPC ......... H04W 28/06; H04W 4/70; H04W 4/06; H04W 72/0453; H04W 84/12
(Continued)

(56) References Cited

U.S. PATENT DOCUMENTS 8,374,087 B2 * 2/2013 Dacosta ................ H04W 28/08
370/232
2014/0086136 A1 3/2014 Angst
(Continued)

FOREIGN PATENT DOCUMENTS

| EP | 2712124 | 3/2014 |
| EP | 3211838 | 8/2017 |

(Continued)

OTHER PUBLICATIONS

Sauter et al., "Majority Manchester Decoding for Active Redundant Data Transmission," IEEE, 1995. (Year: 1995).*
(Continued)

*Primary Examiner* — Christopher R Crompton
(74) *Attorney, Agent, or Firm* — Cozen O'Connor

(57) ABSTRACT

A radio communication system for an industrial automation system includes at least one radio base station and at least one radio subscriber station that each have a multiplexer unit for data frames that are to be sent redundantly, where the radio base station and the radio subscriber station each transmit data frames that are to be sent redundantly in parallel using multiple different carrier frequencies and each comprise a redundancy handling unit for processing received redundant data frames, and where the redundancy handling units each detect received redundant data frames or
(Continued)

restore redundantly sent data frames from different data frame fragments.

22 Claims, 2 Drawing Sheets

(51) Int. Cl.
  *H04W 72/04* (2009.01)
  *H04W 4/06* (2009.01)
  *H04W 4/70* (2018.01)

(58) Field of Classification Search
  USPC .......................................................... 370/228
  See application file for complete search history.

(56) References Cited

U.S. PATENT DOCUMENTS

| | | | | |
|---|---|---|---|---|
| 2015/0333793 | A1* | 11/2015 | Rentschler | H04B 1/74 370/228 |
| 2019/0123933 | A1 | 4/2019 | Mueller | |
| 2019/0305913 | A1* | 10/2019 | Schierl | H04L 1/189 |
| 2020/0059821 | A1* | 2/2020 | Wirth | H04L 5/0094 |
| 2020/0287661 | A1* | 9/2020 | Maierbacher | H03M 13/3761 |

FOREIGN PATENT DOCUMENTS

| | | | |
|---|---|---|---|
| EP | 3211962 | 8/2017 | |
| JP | 2013255227 | * 12/2013 | ........... H04B 7/0417 |
| WO | 2014187893 | 11/2014 | |

OTHER PUBLICATIONS

Sugiyama et al., "Reliable and Efficient Parallel Transmission Protocols in P2P Networks," IEEE, 2015. (Year: 2015).*
Cena Gianluca et al: "An enhanced MAC to increase reliability in redundant Wi-Fi networks"; 2014 10th IEEE Workshop on Factory Communication Systems (WFCS 2014), IEEE; pp. 1-10; XP032608485; DOI: 10.1109/WFCS.2014.6837591, col. 1-3; 2014.
Del Coso A et al: "Space-Time Coded Cooperative Multicasting with Maximal Ratio Combining and Incremental Redundancy", Proceedings of the 2007 IEEE International Conference on Communications (ICC 2007), Jun. 24-28, 2007, Glasgow, UK, IEEE, Piscataway, NJ, USA, pp. 6079-6084, XP031126640, ISBN: 978-1-4244-0353-0, col. 1-2; 2007.
Gianluca Cena et a: "Dynamic duplicate deferral techniques for redundant Wi-Fi networks"; Proceedings of the 2014 IEEE Emerging Technology and Factory Automation (ETFA); pp. 1-8.; XP055288729, DOI: 10.1109/ETFA.2014.7005156; ISBN: 978-1-4799-4845-1; col. 2-7; 2014.
Wikipedia: "Diversity Combining" XP055557234 Apr. 2, 2017.
PCT International Search Report dated Feb. 27, 2019 based on PCT/EP2018/065251 filed Dec. 17, 2018.
EP Search Report dated Mar. 30, 2020 based on EP18153191 filed Jan. 24, 2018.

* cited by examiner

RADIO COMMUNICATION SYSTEM FOR AN INDUSTRIAL AUTOMATION SYSTEM AND METHOD FOR OPERATING THE RADIO COMMUNICATION SYSTEM

CROSS-REFERENCE TO RELATED APPLICATIONS

This is a U.S. national stage of application No. PCT/EP2018/085251 filed 17 Dec. 2018. Priority is claimed on European Application No. 18153191 filed 24 Jan. 2018, the content of which is incorporated herein by reference in its entirety.

BACKGROUND OF THE INVENTION

1. Field of the Invention

The invention relates to industrial automation systems and, more particularly, to a radio communication system for an industrial automation system and method for operating the radio communication system.

2. Description of the Related Art

Industrial automation systems are used for monitoring, control and regulation of technical processes, in particular in the field of production, process and buildings automation, and allow operation of control facilities, sensors, machines and industrial installations that, as far as possible, is supposed to occur on its own and independently of human intervention. On account of continuously increasing importance of information technology for automation systems that comprise numerous networked control and computer units, methods for reliably providing functions that are distributed over an automation system and intended to provide monitoring, control and regulation functions are becoming increasingly important.

Interruptions in communication connections between computer units of an industrial automation system or automation devices can result in undesirable or unnecessary repetition of a communication of a service request. Additionally, messages that are not communicated or not communicated completely can prevent an industrial automation system from changing to or remaining in a safe operating state, for example. This can ultimately result in failure of a complete production installation and a costly production outage. A particular problem in industrial automation systems regularly results from message traffic having a comparatively large number of messages but relatively short messages, as a result of which the above problems are intensified.

In order to be able to compensate for failures of communication connections or devices, communication protocols, such as Media Redundancy Protocol, High-availability Seamless Redundancy or Parallel Redundancy Protocol, have been developed for high-availability industrial communication networks that are able to be operated in a redundant manner. The Media Redundancy Protocol (MSR) is defined in the International Electrotechnical Commission (IEC) 62439 standard and makes it possible to compensate for individual connection failures in networks having a simple ring topology in the case of bumpy redundant transmission of messages. According to the Media Redundancy Protocol, a redundancy manager is assigned to a switch having two ports inside the ring topology, which redundancy manager monitors the network for connection failures and possibly initiates a switching measure to close the ring.

Bumpy media redundancy methods can be implemented, in principle, with relatively little effort. However, the disadvantage is that, on the one hand, messages may be lost in the event of a fault and, on the other hand, a fault state is first of all present during reconfiguration of a communication network. Such a fault state must be made safe via a superimposed communication protocol, for example using TCP/IP on the network or transport layer, in order to avoid an interruption in a communication connection.

PROFINET (IEC 61158 Type 10) also refers to the Media Redundancy Protocol as a bumpy media redundancy method inside a communication network with a ring topology. By contrast, Media Redundancy Planned Duplication (MRPD) is an extension for bumpless transmission of isochronous realtime data. However, Media Redundancy Planned Duplication is not an application-neutral bumpless media redundancy method but rather a PROFINET-specific extension.

High-availability Seamless Redundancy (HSR) and the Parallel Redundancy Protocol (PRP) are defined in the IEC 62439-3 standard and make it possible to bumplessly transmit messages in a redundant manner with extremely short recovery times. According to High-availability Seamless Redundancy and the Parallel Redundancy Protocol, each message is duplicated by a transmitting communication device and is sent to a receiver on two different paths. A communication device at the receiver end filters redundant messages constituting duplicates from a received data stream.

The IEC 62439-3 standard has previously stipulated exclusively wired transmission links for the Parallel Redundancy Protocol (PRP) on account of relatively long latency delays in wireless communication systems and a nondeterministic transmission behavior caused thereby. Suitability of WLAN transmission links in PRP communication networks is investigated in "Towards a Reliable Parallel Redundant WLAN Black Channel", Markus Rentschler, Per Laukemann, IEEE 2012. Parallel application of various diversity techniques for space, time and frequency, for example, can be used to adequately compensate for effects of stochastic channel fading in WLAN communication networks.

EP 2 712 124 A1 discloses a redundantly operated industrial communication system having communication devices redundantly connected to an industrial communication network, where messages are transmitted wirelessly at least in sections. A plurality of buffer storage units for message elements received in a wired manner at a network node and for message elements to be wirelessly transmitted by the latter are provided in the industrial communication network. If a maximum buffer size is exceeded, then an oldest message element in the respective buffer storage unit is deleted. Until the maximum buffer size is exceeded, the oldest message element is selected as the next message element to be wirelessly transmitted.

A first communication device having a redundancy function in accordance with EP 3 211 838 A1 is redundantly connected to a first switch or the like via a first and second communication network port in a redundantly operable industrial communication system. Analogously, a second communication device having a redundancy function is redundantly connected to a second switch or the like via a first and second communication network port. Data frames conveyed from the first communication network port of the first and second communication devices to the respective switch are assigned to a first virtual local area network, while data frames conveyed from the second communication network port of the first and second communication devices to the respective switch are assigned to a second virtual local area network. Data frames assigned to the first virtual local area network are sent via a first radio network by a respective first radio transceiver station, while data frames assigned to the second virtual local area network are sent via a second radio network by a respective second radio transceiver station.

EP 3 211 962 A1 relates to a radio communication system for an industrial automation system, where at least one first and one second communication device are redundantly connected to an industrial communication network. The first and second communication devices are each indirectly or directly connected to a respective first and to a respective second radio transceiver station via their first and via their second communication network port. The first and second radio transceiver stations stipulate an order for data frames that are to be sent within a prescribed time interval based on destination MAC addresses assigned to the data frames that are to be sent. The order within data frames that are to be sent to a selected destination media access control (MAC) address is stipulated by their input order.

WO 2014/187893 A1 discloses a conventional system. However, there is in particular no provision therein for data frames to be restored from data frame fragments that have each been received incompletely or erroneously via different transmission links. Instead, straight timing combining is used therein, via which a datagram completely received for the first time is forwarded immediately and copies arriving later via redundant paths are rejected.

A conventional system is also known from "Dynamic duplicate deferral techniques redundant Wi-Fi networks", Gianluca Cena et al., PROCEEDINGS OF THE 2014 IEEE EMERGING TECHNOLOGY AND FACTORY AUTOMATION (ETFA), Sep. 1, 2014 (2014-09-01), pages 1-8 and from "An enhanced MAC to increase reliability in redundant Wi-Fi networks", Gianluca Cena et al., 2014 10TH IEEE WORKSHOP ON FACTORY COMMUNICATION SYSTEMS (WFCS 2014), IEEE, May 5, 2014 (2014-05-05), pages 1-10.

"Space-Time Coded Cooperative Multicasting with Maximal Ratio Combining and Incremental Redundancy", A. Del Coso et al., PROCEEDINGS OF THE 2007 IEEE INTERNATIONAL CONFERENCE ON COMMUNICATIONS (ICC 2007), Jun. 24-28, 2007, GLASGOW, UK, IEEE, PISCATAWAY, N.J., USA, Jun. 1, 2007 (2007-06-01), pages 6079-6084 states that redundancy handling units restore redundantly sent data frames from different data frame fragments via maximum ratio combining, selection combining or incremental redundancy. The equivalent is also known from "Diversity Combining" published on Feb. 14, 2019 at the Wikipedia website.

SUMMARY OF THE INVENTION

It is an object of the present invention provide a failsafe radio communication system for an industrial automation system that allows more efficient radio resource use, a method for operation thereof and suitable system components.

This and other objects and advantage are achieved in accordance with the invention by a radio communication system, a radio base station, a radio subscriber station and by a method, where the radio communication system in accordance with the invention for an industrial automation system has at least one radio base station, which comprises at least one radio transmission and reception unit. Additionally, at least one radio subscriber station is provided, which is connectable to the radio base station, and which comprises at least one radio transmission and reception unit. The radio base station and the radio subscriber station are configured to interchange data frames with one another, where the data frames are transmitted using at least one selected carrier frequency.

The radio base station and the radio subscriber station each comprise, in accordance with the invention, a multiplexer unit for data frames that are to be sent redundantly. Furthermore, the radio base station and the radio subscriber station are each configured to transmit data frames that are to be sent redundantly in parallel using multiple different carrier frequencies. Additionally, the radio base station and the radio subscriber station each comprise a redundancy handling unit for processing received redundant data frames. The redundancy handling units are each configured to detect received redundant data frames and to restore redundantly sent data frames from different data frame fragments.

The radio communication system in accordance with the invention affords a significant reduction in latency and jitter, in particular by virtue of redundant information being transmitted in parallel using multiple different carrier frequencies instead of serially. Given the usual separation of the carrier frequencies, it is moreover highly unlikely that interference will be caused by the same source of interference on multiple carrier frequencies at the same time. The radio communication system in accordance with the invention therefore affords increased insensitivity toward interference.

In accordance with a preferred embodiment of the present invention, the radio base station and the radio subscriber station are each configured to separate carrier frequencies used for transmitting data frames that are to be sent redundantly in accordance with interband carrier aggregation. This means that the presently disclosed embodiments of the invention can be realized based on proven standardized methods. Furthermore, the multiplexer units can each be configured to code data frames that are to be sent redundantly using different carrier frequencies in accordance with respectively different coding schemes. This allows further increased insensitivity toward interference.

The redundancy handling units are, in accordance with disclosed embodiments of the invention, configured to restore redundantly sent data frames from different data frame fragments via maximum ratio combining, selection combining or incremental redundancy. Such redundancy concepts can also be used to successfully restore redundantly sent data frames even if interference affects multiple or all carrier frequencies. Furthermore, the radio base station and the radio subscriber station are each designed and configured to temporarily enable carrier frequencies that are no longer needed for transmitting data frames identified as time-critical or transmitting data frames identified as non-time critical.

Preferably, the radio base station and the radio subscriber station are each configured to ascertain carrier frequencies used for transmitting data frames that are to be sent redundantly, signal quality values or transmission errors. Appropriate continuous monitoring can be taken as a basis for adaptively selecting carrier frequencies that are used, for example. Furthermore, the radio base station and the radio subscriber station can each be configured to take ascertained signal quality values or transmission errors as a basis for performing code rate adaptation for transmitting data frames that are to be sent redundantly. Advantageously, a signal quality value below a prescribed threshold value or transmission errors above a prescribed threshold value result/s in a code rate decrease being effected. Additionally, a signal quality value above a prescribed threshold value or transmission errors below a prescribed threshold value can result in a code rate increase being effected. In particular, the code rate adaptation can be effected on a carrier-frequency-individual basis.

In accordance with a further advantageous embodiment of the invention, the radio base station and the radio subscriber station are each configured to take ascertained signal quality values or transmission errors as a basis for selecting changed or additional carrier frequencies for transmitting data frames that are to be sent redundantly or enabling carrier frequencies that are used. Advantageously, the radio base station and the radio subscriber station are each configured to ascertain potential sources of interference or carrier frequencies that are usable without interference via cognitive radio. In accordance with the invention, the radio base station and the radio subscriber station can each be configured to preemptively allocate carrier frequencies that are temporarily enabled for transmitting data frames identified as non-time-critical for transmitting data frames identified as time-critical.

In accordance with a preferred embodiment of the invention, the radio base station and the radio subscriber station are each designed to accomplish carrier-sense multiple access (CSMA) collision avoidance and to use listen before talk by listening in on a larger number of carrier frequencies than is actually used. In particular, the radio base station and the radio subscriber station are preferably assigned to a wireless local area network, a Worldwide Interoperability for Microwave Access (WiMAX) mobile radio network, a Universal Mobile Telecommunications System (UMTS) mobile radio network, a Long-Term Evolution (LTE) mobile radio network, a 5G mobile radio network or another mobile radio network.

The radio base station in accordance the disclosed embodiments of the invention is provided for a communication system in accordance with the above-described embodiments and has at least one radio transmission and reception unit. The radio base station is configured to interchange data frames with at least one radio subscriber station, which are transmitted using at least one selected carrier frequency. Additionally, the radio base station comprises a multiplexer unit for data frames that are to be sent redundantly.

Furthermore, the radio base station in accordance with the disclosed embodiments of the invention is configured to transmit data frames that are to be sent redundantly in parallel using multiple different carrier frequencies. Additionally, the radio base station comprises a redundancy handling unit for processing received redundant data frames. The redundancy handling unit is configured to detect received redundant data frames or to restore redundantly sent data frames from different data frame fragments.

The radio subscriber station in accordance with the disclosed embodiments of the invention is provided for a communication system in accordance with the above-described embodiments and has at least one radio transmission and reception unit. The radio subscriber station is configured to interchange data frames with at least one radio base station, which are transmitted using at least one selected carrier frequency. Additionally, the radio subscriber station comprises a multiplexer unit for data frames that are to be sent redundantly.

In addition, the radio subscriber station according to the invention is configured to transmit data frames that are to be sent redundantly in parallel using multiple different carrier frequencies. Additionally, the radio subscriber station comprises a redundancy handling unit for processing received redundant data frames. The redundancy handling unit is configured to detect received redundant data frames or to restore redundantly sent data frames from different data frame fragments.

It is also an object of the invention to provide a method for operating a radio communication system in accordance with the above described embodiments, where the radio communication system has at least one radio base station, having at least one radio transmission and reception unit, and at least one radio subscriber station, which is connectable to the radio base station and comprises at least one radio transmission and reception unit. The radio base station and the radio subscriber station interchange data frames with one another, where the data frames are transmitted using at least one selected carrier frequency. Both the radio base station and the radio subscriber station each comprise a multiplexer unit for data frames that are to be sent redundantly.

Furthermore, the radio base station and the radio subscriber station utilize the method in accordance with the invention to each transmit data frames that are to be sent redundantly in parallel using multiple different carrier frequencies. The radio base station and the radio subscriber station additionally each comprise a redundancy handling unit for processing received redundant data frames. The redundancy handling units each detect received redundant data frames or restore redundantly sent data frames from different data frame fragments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is illustrated in more detail below using an exemplary embodiment with reference to the drawing, in which.

DETAILED DESCRIPTION OF THE EXEMPLARY EMBODIMENTS

Figure 1:
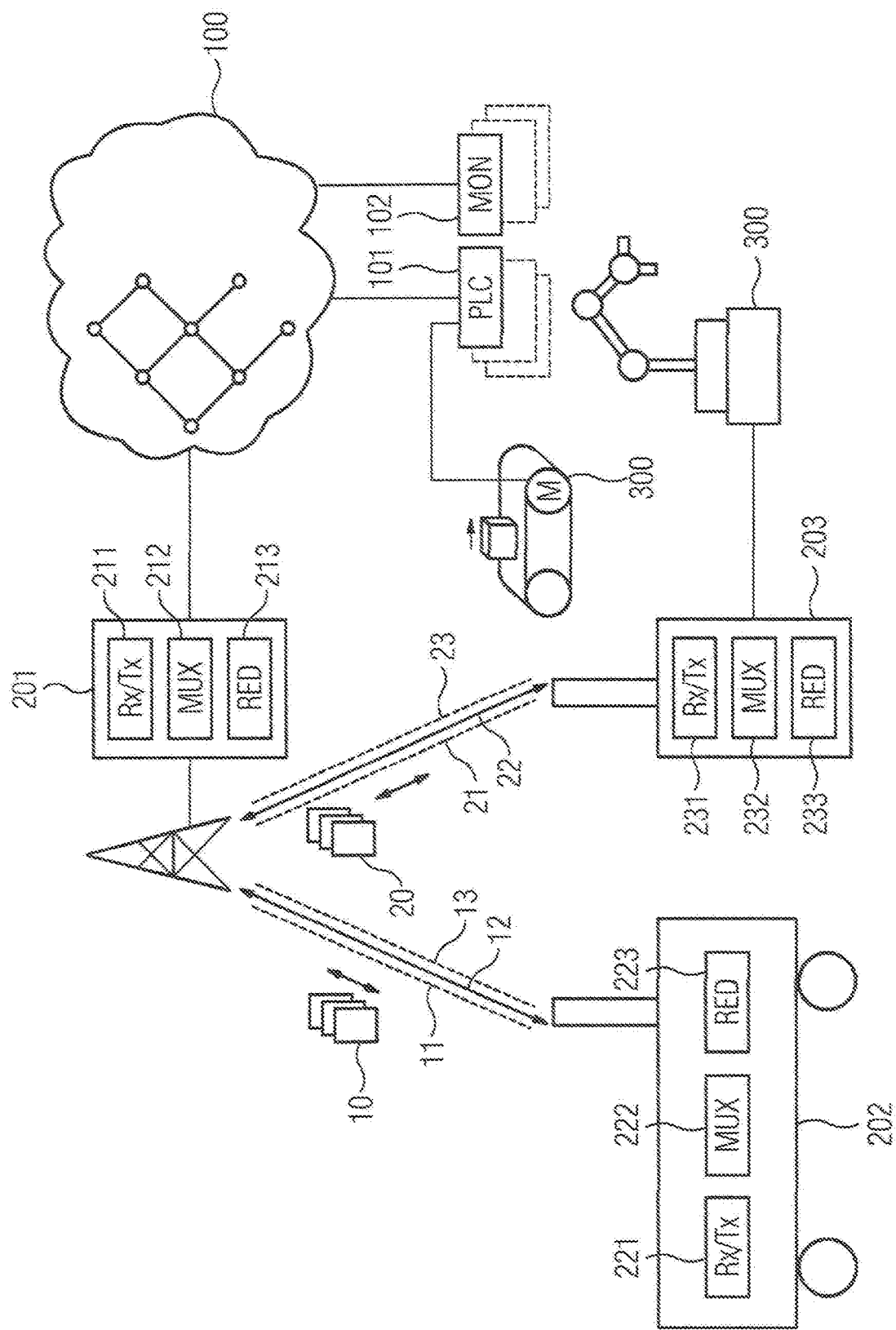
FIG. 1 is a schematic block diagram of an industrial automation system having a communication network and a radio communication system connected thereto in accordance the invention.

The industrial automation system depicted in FIG. 1 comprises a communication network 100 to which multiple automation devices 101, 102 and a radio communication system are connected. The radio communication system in the present exemplary embodiment comprises a wired radio base station 201, which is connected to the communication network 100, and multiple radio subscriber stations 202, 203, which are connectable to the radio base station 201.

The communication network 100 comprises a multiplicity of network nodes on which network infrastructure devices are provided. The network infrastructure devices 201, 202, may be switches, routers or firewalls, for example, and can be used to connect automation devices 101, 102. Automation devices include in particular programmable logic controllers 101, input/output units (I/O modules) or operating and observation stations 102 of the industrial automation system.

Programmable logic controllers 101 typically each comprise a communication module, a central unit and at least one input/output unit. Input/output units may fundamentally also be designed as local peripheral modules arranged remotely from a programmable logic controller. The communication module thereof can be used to connect a programmable logic controller 101 to a switch or router or additionally to a field bus, for example. The input/output unit is used for interchanging control and measured variables between a programmable logic controller 101 and a sensor, or a controlled machine or installation, 300 connected to the programmable logic controller 101. A sensor or a machine or installation 300 can fundamentally also be connected to a programmable logic controller 101 via the radio communication system. The central unit of a programmable logic controller 101 is provided in particular for ascertaining suitable control variables from captured measured variables. The above components of a programmable logic controller 101 can be connected to one another via a backplane bus system, for example.

An operating and observation station 102 is used in particular to visualize process data or measured and control variables that are processed or captured by programmable logic controllers, input/output units or sensors. In particular, an operating and observation station 102 is used to display values of a control loop and to alter control parameters. Operating and observation stations 102 comprise at least a graphical user interface, an input device, a processing unit and a communication module.

Both the radio base station 201 and the radio subscriber stations 202, 203 each comprise a radio transmission and reception unit 211, 221, 231 besides an antenna arrangement. The radio base station 201 and the radio subscriber stations 202, 203 can be assigned to a wireless local area network, a WiMAX mobile radio network, a UMTS mobile radio network, an LTE mobile radio network, a 5G mobile radio network or another mobile radio network, for example. Furthermore, the radio base station 201, on the one hand, and the radio subscriber stations 202, 203, on the other hand, are configured to use the radio base station 201 to interchange data frames 10, 20 transmitted using selected carrier frequencies. In the present exemplary embodiment, the data frames 10, 20 comprise in particular process data or measured and control variables that are assigned to vehicles or sensors, machines or installations 300 connected to the radio subscriber stations 202, 203.

Additionally, the radio base station 201 and the radio subscriber stations 202, 203 each comprise a multiplexer unit 212, 222, 232 for data frames 10, 20 that are to be sent redundantly. The radio base station 201 and the radio subscriber stations 202, 203 each transmit data frames 10, 20 that are to be sent redundantly in parallel using multiple different carrier frequencies 11, 12, 13, 21, 22, 23. Moreover, the radio base station 201 and the radio subscriber stations 202, 203 are each configured to separate carrier frequencies used for transmitting data frames that are to be sent redundantly by using interband carrier aggregation. Preferably, the radio base station 201 and the radio subscriber stations 202, 203 each accomplish CSMA collision avoidance and use listen before talk by listening in on a larger number of carrier frequencies than is actually used. In accordance with an advantageous embodiment, the multiplexer units 212, 222, 232 are each configured to code data frames that are to be sent redundantly using different carrier frequencies by using respectively different coding schemes.

In addition, the radio base station 201 and the radio subscriber stations 202, 203 each comprise a redundancy handling unit 213, 223, 233 for processing received redundant data frames. The redundancy handling units 213, 223, 233 are each configured to detect received redundant data frames or to restore redundantly sent data frames from different data frame fragments. Redundantly sent data frames are restored from different data frame fragments preferably via maximum ratio combining, selection combining or incremental redundancy.

In the present exemplary embodiment, the radio base station 201 and the radio subscriber stations 202, 203 each ascertain signal quality values or transmission errors for carrier frequencies used for transmitting data frames that are to be sent redundantly. Ascertained signal quality values or transmission errors are taken as a basis for the radio base station 201 or the radio subscriber stations 202, 203 to perform code rate adaptation for transmitting data frames that are to be sent redundantly. In particular, a signal quality value below a prescribed threshold value or transmission errors above a prescribed threshold value result/s in a code rate decrease occurring. By contrast, a signal quality value above a prescribed threshold value or transmission errors below a prescribed threshold value result/s in a code rate increase occurring. In accordance with a preferred embodiment, the code rate adaptation takes place in carrier-frequency-individual manner.

Furthermore, the radio base station 201 and the radio subscriber stations 202, 203 are each configured to take ascertained signal quality values or transmission errors as a basis for selecting changed or additional carrier frequencies to transmit data frames that are to be sent redundantly or for enabling carrier frequencies that are used. Potential sources of interference or carrier frequencies that are usable without interference are advantageously ascertained via cognitive radio. Further, the radio base station 201 and the radio subscriber stations 202, 203 can each be configured to temporarily enable carrier frequencies that are no longer needed for transmitting data frames identified as time-critical for transmitting data frames identified as non-time-critical. By way of example, the radio base station 201 or the radio subscriber stations 202, 203 pre-emptively allocate carrier frequencies that are temporarily enabled for transmitting data frames identified as non-time-critical for transmitting data frames identified as time-critical. This allows particularly efficient use of available carrier frequencies, without adversely affecting time-critical data traffic.

Figure 2:
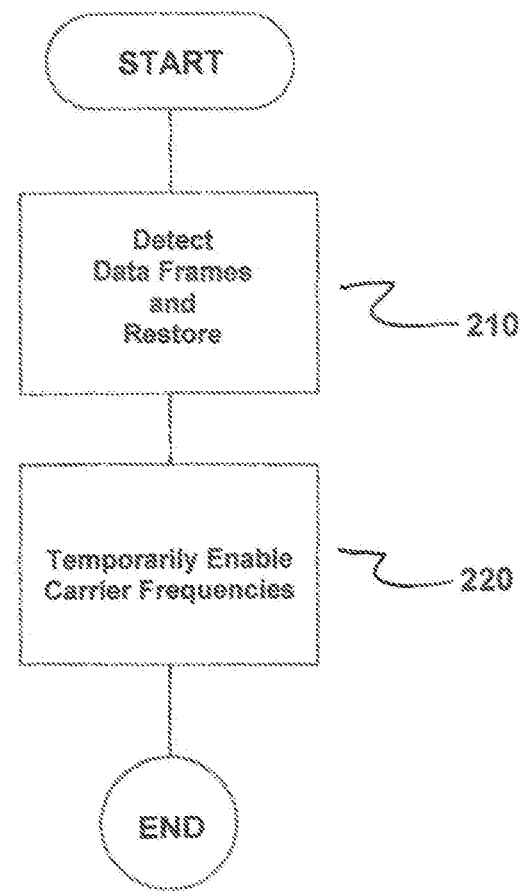
FIG. 2 is a flowchart of the method in accordance with the invention.

FIG. 2 is a flowchart of a method for operating a radio communication system for an industrial automation system, where the radio communication system includes at least one radio base station 201 comprising at least one radio transmission and reception unit 211, and includes at least one radio subscriber station 202, 203, which is connectable to the at least one radio base station, and which comprises at least one radio transmission and reception unit 221, 231. In accordance with the method of the invention, the at least one radio base station 201 and the at least one radio subscriber station 202, 203 interchange data frames 10, 20 with one another, where data frames are transmitted at least utilizing a selected carrier frequency. In addition, the at least one radio base station 201 and the at least one radio subscriber station 202, 203 each comprise a multiplexer unit 212, 222, 232 for data frames which are to be sent redundantly and each transmits data frames which are to be sent redundantly in parallel using multiple different carrier frequencies 11, 12,

13, 21, 22,23, and the at least one radio base station 201 and the at least one radio subscriber station 202, 203 each comprise a redundancy handling unit 213, 223, 233 for processing received redundant data frames. The method comprises detecting, by redundancy handling units 213, 223, 233, received redundant data frames and restoring redundantly sent data frames from different data frame fragments, as indicated in step 210. Here, the redundancy handling units 213, 223, 233 each restore redundantly sent data frames from different data frame fragments via maximum ratio combining, selection combining or incremental redundancy.

Next, the at least one radio base station 201 and the at least one radio subscriber station 202, 203 each temporarily enable carrier frequencies which are no longer needed for transmitting data frames identified as time-critical for transmitting data frames identified as non-time-critical, as indicated in step 220.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio communication system for an industrial automation system, comprising:
at least one radio base station comprising at least one radio transmission and reception unit;
at least one radio subscriber station, connectable to the radio base station, said at least one radio subscriber station comprising at least one radio transmission and reception unit;
wherein the at least one radio base station and the at least one radio subscriber station are each configured to interchange data frames with one another, said data frames being transmitted at least utilizing a selected carrier frequency;
wherein the at least one radio base station and the at least one radio subscriber station each comprise a multiplexer unit for data frames which are to be sent redundantly and are each configured to transmit data frames which are to be sent redundantly in parallel utilizing multiple different carrier frequencies;
wherein the at least one radio base station and the at least one radio subscriber station each comprise a redundancy handling unit for processing received redundant data frames;
wherein each redundancy handling unit is each configured to detect received redundant data frames and to restore redundantly sent data frames from different data frame fragments;
wherein each redundancy handling unit is configured to restore redundantly sent data frames from different data frame fragments via one of (i) maximum ratio combining (ii) selection combining and (iii) incremental redundancy; and
wherein the at least one radio base station and the at least one radio subscriber station are each configured to temporarily enable carrier frequencies which are no longer needed for transmitting data frames identified as time-critical for transmitting data frames identified as nontime-critical.

2. The communication system as claimed in claim 1, wherein the at least one radio base station and the at least one radio subscriber station are each configured to separate carrier frequencies utilized for transmitting data frames which are to be sent redundantly by utilizing interband carrier aggregation.

3. The communication system as claimed in claim 1, wherein each multiplexer units is configured to code data frames which are to be sent redundantly utilizing different carrier frequencies by utilizing respectively different coding schemes.

4. The communication system as claimed in claim 2, wherein each multiplexer units is configured to code data frames which are to be sent redundantly utilizing different carrier frequencies by utilizing respectively different coding schemes.

5. The communication system as claimed in claim 1, wherein the at least one radio base station and the at least one radio subscriber station are each configured to ascertain at least one of (i) carrier frequencies utilized for transmitting data frames which are to be sent redundantly, (ii) signal quality values and (iii) transmission errors.

6. The communication system as claimed in claim 2, wherein the at least one radio base station and the at least one radio subscriber station are each configured to ascertain at least one of (i) carrier frequencies utilized for transmitting data frames which are to be sent redundantly, (ii) signal quality values and (iii) transmission errors.

7. The communication system as claimed in claim 3, wherein the at least one radio base station and the at least one radio subscriber station are each configured to ascertain at least one of (i) carrier frequencies utilized for transmitting data frames which are to be sent redundantly, (ii) signal quality values and (iii) transmission errors.

8. The communication system as claimed in claim 5, wherein the at least one radio base station and the at least one radio subscriber station are each configured to take at least one of (i) ascertained signal quality values and (ii) ascertained transmission errors as a basis for performing code rate adaptation for transmitting data frames which are to be sent redundantly.

9. The communication system as claimed in claim 8, wherein at least one of (i) a signal quality value below a prescribed threshold value and (ii) transmission errors above a prescribed threshold value results in a code rate decrease occurring.

10. The communication system as claimed in claim 8, wherein at least one of (i) a signal quality value above a prescribed threshold value and (ii) transmission errors below a prescribed threshold value results in a code rate increase occurring.

11. The communication system as claimed in claim 9, wherein at least one of (i) a signal quality value above a prescribed threshold value and (ii) transmission errors below a prescribed threshold value results in a code rate increase occurring.

12. The communication system as claimed in claim 8, wherein the code rate adaptation occurs in a carrier-frequency-individual manner.

13. The communication system as claimed in claim 9, wherein the code rate adaptation occurs in a carrier-frequency-individual manner.

14. The communication system as claimed in claim 10, wherein the code rate adaptation occurs in a carrier-frequency-individual manner.

15. The communication system as claimed in claim 5, wherein the at least one radio base station and the at least one radio subscriber station are each configured to take at least one of (i) ascertained signal quality values and (ii) ascertained transmission errors as a basis for one of (i) selecting changed or additional carrier frequencies to transmit data frames which are to be sent redundantly and (ii) enabling carrier frequencies which are utilized.

16. The communication system as claimed in claim 15, wherein the at least one radio base station and the at least one radio subscriber station are each configured to at least one of (i) ascertain potential sources of interference and (ii) ascertain carrier frequencies which are usable without interference via cognitive radio.

17. The communication system as claimed in claim 16, wherein the at least one radio base station and the at least one radio subscriber station are each configured to pre-emptively allocate carrier frequencies which are temporarily enabled for transmitting data frames identified as non-time-critical for transmitting data frames identified as time-critical.

18. The communication system as claimed in claim 1, wherein the at least one radio base station and the at least one radio subscriber station are each configured to accomplish CSMA collision avoidance and to utilize listen before talk by listening in on a larger number of carrier frequencies than is actually utilized.

19. The communication system as claimed in claim 1, wherein the at least one radio base station and the at least one radio subscriber station are assigned to one of (i) a wireless local area network, (ii) a Worldwide Interoperability for Microwave Access (WiMAX) mobile radio network, (iii) a Universal Mobile Telecommunications System (UMTS) mobile radio network, (iv) a Long-Term Evolution (LTE) mobile radio network, (v) a 5G mobile radio network and (vi) another mobile radio network.

20. A radio base station for a communication system, comprising:
   at least one radio transmission and reception unit configured to interchange data frames with at least one radio subscriber station, said data frames being transmitted at least utilizing a selected carrier frequency;
   wherein the at least one radio base station comprises a multiplexer unit for data frames which are to be sent redundantly and is configured to transmit data frames which are to be sent redundantly in parallel using multiple different carrier frequencies;
   wherein the at least one radio base station further comprises a redundancy handling unit for processing received redundant data frames, said redundancy handling unit being configured to detect received redundant data frames and to restore redundantly sent data frames from different data frame fragments;
   wherein the redundancy handling unit is configured to restore redundantly sent data frames from different data frame fragments via one of (i) maximum ratio combining, (ii) selection combining and (iii) incremental redundancy; and
   wherein the at least one radio base station is configured to temporarily enable carrier frequencies which are no longer needed for transmitting data frames identified as time-critical for transmitting data frames identified as non-time-critical.

21. A radio subscriber station for a communication system, comprising:
   at least one radio transmission and reception unit configured to interchange data frames with at least one radio base station, said data frames being transmitted at least utilizing a selected carrier frequency;
   wherein the at least one radio subscriber station comprises a multiplexer unit for data frames which are to be sent redundantly and is configured to transmit data frames which are to be sent redundantly in parallel utilizing multiple different carrier frequencies;
   wherein the at least one radio subscriber station further comprises a redundancy handling unit for processing received redundant data frames;
   wherein the redundancy handling unit is ad configured to detect received redundant data frames and to restore redundantly sent data frames from different data frame fragments;
   wherein the redundancy handling unit is further configured to restore redundantly sent data frames from different data frame fragments via one of (i) maximum ratio combining, (ii) selection combining and (iii) incremental redundancy;
   wherein the radio subscriber station is configured to temporarily enable carrier frequencies which are no longer needed for transmitting data frames identified as time-critical for transmitting data frames identified as nontime-critical.

22. A method for operating a radio communication system for an industrial automation system, the radio communication system having at least one radio base station comprising at least one radio transmission and reception unit, and comprising at least one radio subscriber station, which is connectable to the at least one radio base station, and which comprises at least one radio transmission and reception unit, the at least one radio base station and the at least one radio subscriber station interchanging data frames with one another, said data frames being transmitted at least utilizing a selected carrier frequency, the at least one radio base station and the at least one radio subscriber station each comprising a multiplexer unit for data frames which are to be sent redundantly and each transmitting data frames which are to be sent redundantly in parallel using multiple different carrier frequencies, and the at least one radio base station and the at least one radio subscriber station each comprising a redundancy handling unit, for processing received redundant data frames, the method comprising:
   detecting, by redundancy handling units, received redundant data frames and restoring redundantly sent data frames from different data frame fragments, said redundancy handling units each restoring redundantly sent data frames from different data frame fragments via one of (i) maximum ratio combining, (ii) selection combining and (iii) incremental redundancy; and
   enabling temporarily, by the at least one radio base station and the at least one radio subscriber station, carrier frequencies which are no longer needed for transmitting data frames identified as time-critical for transmitting data frames identified as non-time-critical.

* * * * *